United States Patent
Morioka et al.

(10) Patent No.: US 9,794,778 B2
(45) Date of Patent: Oct. 17, 2017

(54) MOBILE COMMUNICATION METHOD AND MOBILE STATION TO PROHIBIT RETRANSMISSION OF ASSISTANCE INFORMATION

(71) Applicant: NTT DOCOMO, INC., Tokyo (JP)

(72) Inventors: Yasufumi Morioka, Tokyo (JP); Tooru Uchino, Tokyo (JP); Wuri Andarmawanti Hapsari, Tokyo (JP); Atsushi Ueki, Tokyo (JP); Kenichiro Aoyagi, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/406,227

(22) PCT Filed: Jul. 10, 2013

(86) PCT No.: PCT/JP2013/068861
§ 371 (c)(1),
(2) Date: Dec. 8, 2014

(87) PCT Pub. No.: WO2014/013918
PCT Pub. Date: Jan. 23, 2014

(65) Prior Publication Data
US 2015/0156625 A1 Jun. 4, 2015

(30) Foreign Application Priority Data
Jul. 20, 2012 (JP) .................................. 2012-161398

(51) Int. Cl.
H04M 11/00 (2006.01)
H04M 1/66 (2006.01)
(Continued)

(52) U.S. Cl.
CPC ................. *H04W 8/22* (2013.01); *H04L 1/18* (2013.01); *H04W 76/04* (2013.01); *H04W 28/18* (2013.01); *H04W 76/028* (2013.01)

(58) Field of Classification Search
CPC ... H04W 52/24; H04W 52/12; H04W 72/082; H04W 8/08; H04W 74/0808; H04L 1/0003
(Continued)

(56) References Cited

U.S. PATENT DOCUMENTS 7,321,589 B2 * 1/2008 Lohr .................... H04B 7/2612
370/278
7,408,907 B2 * 8/2008 Diener .................. H04L 1/1664
370/338
(Continued)

OTHER PUBLICATIONS

Research in Motion UK Limited; "A Framework for Management of Background Traffic UEs;" 3GPP TSG-RAN WG2 Meeting #77, R2-121609; Jeju, South Korea; Mar. 26-30, 2012 (4 pages).
(Continued)

*Primary Examiner* — William D Cumming
(74) *Attorney, Agent, or Firm* — Osha Liang LLP (57) ABSTRACT

An objective is to prohibit retransmission of "UE assistance information". A mobile communication method according to the present invention includes the steps of: transmitting "UE assistance information" to a radio base station (eNB) by a mobile station (UE), the "UE assistance information" prompting the radio base station (eNB) to change a parameter for the mobile station UE used in the radio base station; notifying, by the radio base station (eNB), the mobile station (UE) of a transmission-prohibited period of the "UE assistance information"; and stopping, by the mobile station (UE), retransmission of the "UE assistance information" on the basis of the transmission-prohibited period.

2 Claims, 4 Drawing Sheets

(51) Int. Cl.

| | |
|---|---|
| H04M 1/68 | (2006.01) |
| H04M 3/16 | (2006.01) |
| H04M 3/00 | (2006.01) |
| H04B 7/00 | (2006.01) |
| H04B 1/38 | (2015.01) |
| H04W 8/22 | (2009.01) |
| H04W 76/04 | (2009.01) |
| H04L 1/18 | (2006.01) |
| H04W 76/02 | (2009.01) |
| H04W 28/18 | (2009.01) |

(58) Field of Classification Search
 USPC ...... 455/69, 419, 517, 574, 411, 456.4, 515;
  370/319, 338, 394, 252, 328
 See application file for complete search history.

(56) References Cited

U.S. PATENT DOCUMENTS

| | | | | |
|---|---|---|---|---|
| 7,424,268 | B2* | 9/2008 | Diener | H04L 1/0001 370/241 |
| 7,706,330 | B2* | 4/2010 | Sartori | H04L 1/0015 370/333 |
| 7,894,444 | B2* | 2/2011 | Lohr | H04B 7/2612 370/278 |
| 8,175,539 | B2* | 5/2012 | Diener | H04L 1/0001 370/318 |
| 8,190,186 | B2* | 5/2012 | Shiouchi | H04W 74/0808 455/456.4 |
| 8,542,111 | B2* | 9/2013 | Wesby-van Swaay | H04M 1/05 340/539.12 |
| 8,593,976 | B2* | 11/2013 | Kishigami | H04B 7/04 370/252 |
| 2004/0028003 | A1* | 2/2004 | Diener | H04L 1/0001 370/319 |
| 2004/0047324 | A1* | 3/2004 | Diener | H04L 1/1664 370/338 |
| 2006/0258410 | A1* | 11/2006 | Collins | H04B 1/1615 455/574 |
| 2007/0077952 | A1* | 4/2007 | Sartori | H04L 1/0015 455/515 |
| 2008/0008147 | A1* | 1/2008 | Nakayama | H04W 72/082 370/338 |
| 2008/0146263 | A1* | 6/2008 | Shiouchi | H04W 74/0808 455/517 |
| 2009/0016263 | A1* | 1/2009 | Kishigami | H04B 7/04 370/328 |
| 2009/0046625 | A1* | 2/2009 | Diener | H04L 1/0001 370/319 |
| 2010/0070814 | A1 | 3/2010 | Damnjanovic et al. | |
| 2011/0090939 | A1* | 4/2011 | Diener | H04L 1/0001 375/136 |
| 2013/0196633 | A1* | 8/2013 | Wesby van-Swaay | H04M 1/05 455/411 |
| 2015/0156625 | A1* | 6/2015 | Morioka | H04L 1/18 455/419 |
| 2015/0173017 | A1* | 6/2015 | Rakotoharison | H04W 8/08 370/311 |

OTHER PUBLICATIONS

ZTE Corporation; "Introduction of 'Power preference indication';" 3GPP TSG-RAN WG2 Meeting #79, R2-124364; Qingdao, China; Aug. 13-17, 2012 (20 pages).

Samsung; "DRX configuration retention while moving from connected to Idle;" 3GPP TSG-RAN WG2 #78, R2-122505; Prague, Czech Republic; May 21-25, 2012 (3 pages).

Intel Corporation; "Signalling of UE Power Preference Indication;" 3GPP TSG-RAN2 Meeting #79, R2-123964; Qingdao, China; Aug. 13-17, 2012 (6 pages).

Nokia Corporation et al.; "Stage 2 CR on eDDA UE assistance information;" 3GPP TSG-RAN WG2 Meeting #78, R2-123160; Prague, Czech Republic, May 21-25, 2012 (4 pages).

Written Opinion for corresponding International Application No. PCT/JP2013/068861, dated Sep. 24, 2013 (3 pages).

International Search Report for corresponding International Application No. PCT/JP2013/068861, dated Sep. 24, 2013 (1 page).

Extended Search Report issued in corresponding European Application No. 13820582.8, dated Feb. 11, 2016 (7 pages).

Nokia Corporation; "UE assistance information for UE power saving and optimized network performance"; 3GPP TSG-RAN WG2 Meeting #77bis, R2-121203; Jeju, Korea; Mar. 26-30, 2012 (5 pages).

Office Action issued in the counterpart European Patent Application No. 13820582.8, dated Mar. 13, 2017 (5 pages).

* cited by examiner

MOBILE COMMUNICATION METHOD AND MOBILE STATION TO PROHIBIT RETRANSMISSION OF ASSISTANCE INFORMATION

TECHNICAL FIELD

The present invention relates to a mobile communication method and a mobile station.

BACKGROUND ART

In the meeting for developing the specification of LTE-Advanced, a method of setting a mobile station UE to transmit "UE assistance information" was agreed (see Non-patent document 1).

Here, the "UE assistance information" is mobile station assistance information for prompting a radio base station eNB to change a parameter for the mobile station UE used in the radio base station eNB.

Specifically, the mobile station UE is configured to transmit "UE assistance information" to the radio base station eNB when receiving a configuration instruction signal (Configuration) from the radio base station eNB.

Note that the mobile station UE is configured not to transmit "UE assistance information" to the radio base station eNB unless the mobile station UE receives a configuration instruction signal from the radio base station eNB.

At present, two types of information of "UE power preference" and "UE mobility information" are specified as the "UE assistance information".

The "UE power preference" indicates which one of "Power Saving (battery life time)" and "Performance (delay time until service establishment)" the mobile station UE prioritizes.

Moreover, the "UE mobility information" indicates information on the mobility of the mobile station UE in an RRC_IDLE state.

PRIOR ART DOCUMENT

Non-Patent Document

Non-patent document 1: 3GPP contribution R2-123160

SUMMARY OF THE INVENTION

However, the LTE-Advanced specifications agreed at present has a problem that there is no specification on a method of prohibiting the retransmission of "UE assistance information" even if a mobile station UE repeatedly retransmits "UE assistance information" after completing the setting for transmitting the "UE assistance information."

The present invention has been made in view of the above-mentioned problem. An objective of the present invention is to provide a mobile communication method and a mobile station that can prohibit the retransmission of the "UE assistance information".

A first feature of the present invention is summarized as a mobile communication method including the steps of: transmitting mobile station assistance information to a radio base station by a mobile station, the mobile station assistance information prompting the radio base station to change a parameter for the mobile station used in the radio base station; notifying, by the radio base station, the mobile station of a transmission-prohibited period of the mobile station assistance information; and stopping, by the mobile station, retransmission of the mobile station assistance information on the basis of the transmission-prohibited period.

A second feature of the present invention is summarized as a mobile communication method including the steps of: transmitting mobile station assistance information to a radio base station by a mobile station, the mobile station assistance information prompting the radio base station to change a parameter for the mobile station used in the radio base station; notifying, by the radio base station, the mobile station of the number of transmissions permitted for the mobile station assistance information; and when the number of retransmissions of the mobile station assistance information reaches the number of transmissions permitted, stopping, by the mobile station, the retransmission of the mobile station assistance information.

A third feature of the present invention is summarized as a mobile communication method including the steps of: transmitting mobile station assistance information to a radio base station by a mobile station, the mobile station assistance information prompting the radio base station to change a parameter for the mobile station used in the radio base station; transmitting a dedicated signaling to the mobile station by the radio base station, the dedicated signaling indicating retransmission prohibition of the mobile station assistance information; and stopping, by the mobile station, the retransmission of the mobile station assistance information on the basis of the dedicated signaling.

A fourth feature of the present invention is summarized as a mobile station including: a transmitter unit configured to transmit mobile station assistance information to a radio base station, the mobile station assistance information prompting the radio base station to change a parameter for the mobile station used in the radio base station; and a receiver unit configured to acquire a transmission-prohibited period of the mobile station assistance information from the radio base station. Here, the transmitter unit stops retransmission of the mobile station assistance information on the basis of the transmission-prohibited period.

A fifth feature of the present invention is summarized as a mobile station including: a transmitter unit configured to transmit mobile station assistance information to a radio base station, the mobile station assistance information prompting the radio base station to change a parameter for the mobile station used in the radio base station; and a receiver unit configured to acquire the number of transmissions permitted for the mobile station assistance information from the radio base station. Here, when the number of retransmissions of the mobile station assistance information reaches the number of transmissions permitted, the transmitter unit stops the retransmission of the mobile station assistance information.

A sixth feature of the present invention is summarized as a mobile station including: a transmitter unit configured to transmit mobile station assistance information to a radio base station, the mobile station assistance information prompting the radio base station to change a parameter for the mobile station used in the radio base station; and a receiver unit configured to receive a dedicated signaling from the radio base station, the dedicated signaling indicating retransmission prohibition of the mobile station assistance information. Here, the transmitter unit stops the retransmission of the mobile station assistance information on the basis of the dedicated signaling.

MODE FOR CARRYING OUT THE INVENTION (Mobile Communication System of First Embodiment of Present Invention)

A mobile communication system according to a first embodiment of the present invention will be described with reference to FIG. 1 to FIG. 4.

Although an LTE-Advanced mobile communication system will be described as an example in the embodiment, the present invention is not limited to the LTE-Advanced mobile communication system but can be applied to a mobile communication system of another scheme.

Figure 1:
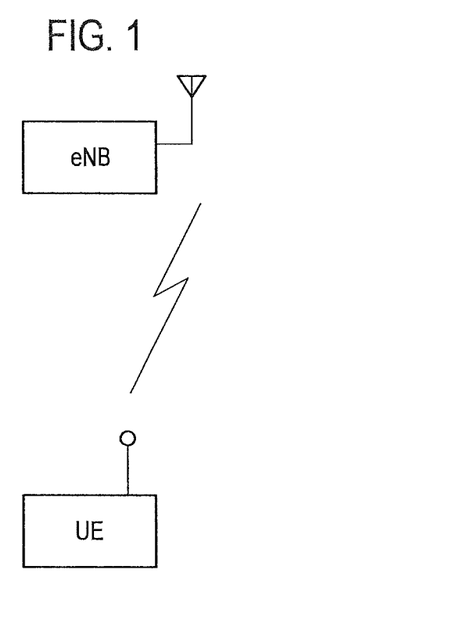
FIG. 1 is an overall configuration diagram of a mobile communication system according to a first embodiment of the present invention.

The mobile communication system according to the embodiment is provided with a radio base station eNB and a mobile station UE, as illustrated in FIG. 1.

Figure 2:
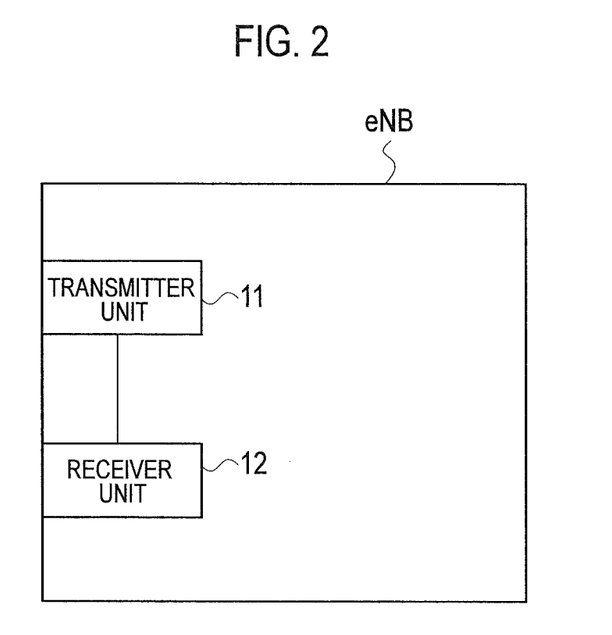
FIG. 2 is a functional block diagram of a radio base station according to the first embodiment of the present invention.

The radio base station eNB is provided with a transmitter unit 11 and a receiver unit 12, as illustrated in FIG. 2.

The transmitter unit 11 is configured to transmit various kinds of signals to the mobile station UE, and the receiver unit 12 is configured to receive various kinds of signals from the mobile station UE.

The transmitter unit 11 is configured to transmit a configuration instruction signal (Configuration) described above to the mobile station UE, for example.

Moreover, the transmitter unit 11 may be configured to notify the mobile station UE of a transmission-prohibited period (Prohibit timer) of "UE assistance information".

The transmitter unit 11 may be configured to notify the mobile station UE of the transmission-prohibited period using an information element "Mac-MainConfig" in an information element "RadioResourceConfigDedicated" included in an "RRC Connection Setup (connection setting signal)", an "RRC Connection Reconfiguration (connection resetting signal)", an "RRC Connection Reestablishment (connection reestablishing signal)", or the like, for example. Note that, any unit can be used as a unit for the transmission-prohibited period.

For example, as the transmission-prohibited period, the transmitter unit 11 may be configured to notify the mobile station UE of "x seconds" showing the time or "x pieces" showing the number of sub-frames.

In addition, as the transmission-prohibited period, the transmitter unit 11 may be configured to notify the mobile station UE of a value (for example, "0") indicating that the transmission-prohibited period is not set, or a value (for example, "infinite") indicating that "UE assistance information" is transmitted only once, and thereafter the transmission is prohibited unless a configuration instruction signal is received again.

Moreover, the receiver unit 12 may be configured to acquire the "UE assistance information" transmitted by the mobile station UE.

Figure 3:
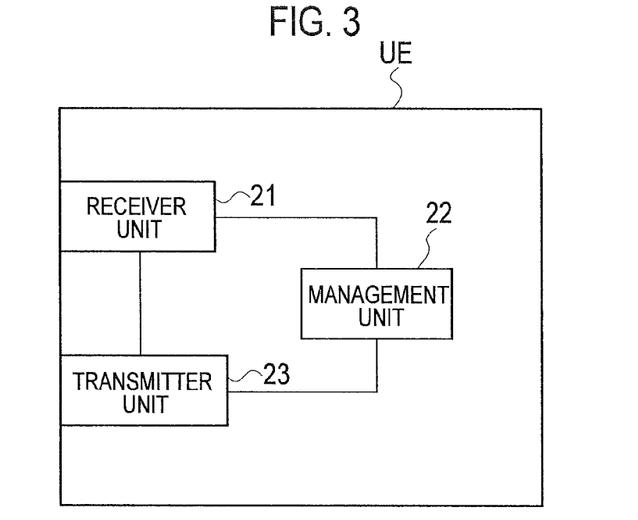
FIG. 3 is a functional block diagram of a mobile station according to the first embodiment of the present invention.

The mobile station UE is provided with a receiver unit 21, a management unit 22, and a transmitter unit 23, as illustrated in FIG. 3.

The receiver unit 21 is configured to receive various kinds of signals from the radio base station eNB, and the transmitter unit 23 is configured to transmit various kinds of signals to the radio base station eNB.

For example, the transmitter unit 23 is configured to transmit "UE assistance information" to the radio base station eNB after the receiver unit 21 receives a configuration instruction signal (Configuration) described above from the radio base station eNB.

Herein, the transmitter unit 23 may be configured to repeatedly transmit "UE assistance information" at a predetermined interval.

Moreover, the receiver unit 21 is configured to acquire a transmission-prohibited period of the "UE assistance information" from the radio base station eNB.

Herein, the management unit 22 is configured to manage the transmission-prohibited period of the "UE assistance information" acquired by the receiver unit 21.

The transmitter unit 23 is configured to stop retransmission of the "UE assistance information" on the basis of the transmission-prohibited period.

For example, the transmitter unit 23 is configured to, when the receiver unit 21 acquires the transmission-prohibited period, transmit the "UE assistance information" only once, and thereafter stop transmission of the "UE assistance information" during a period (for example, x seconds or a period of x sub-frames) specified by the transmission-prohibited period.

Further, the transmitter unit 23 is configured to restart the transmission of the "UE assistance information" after the elapse of the period specified by the transmission-prohibited period.

Note that, the transmitter unit 23 may be configured not to stop the transmission of the "UE assistance information" when the receiver unit 21 acquires "0" as the transmission-prohibited period.

Alternatively, when the receiver unit 21 acquires "infinite" as the transmission-prohibited period, the transmitter unit 23 may transmit the "UE assistance information" only once, and thereafter be kept from transmitting "UE assistance information" unless the receiver unit 21 receives again a configuration instruction signal.

Hereinafter, an operation of the mobile communication system according to the embodiment will be described with reference to FIG. 4.

Figure 4:
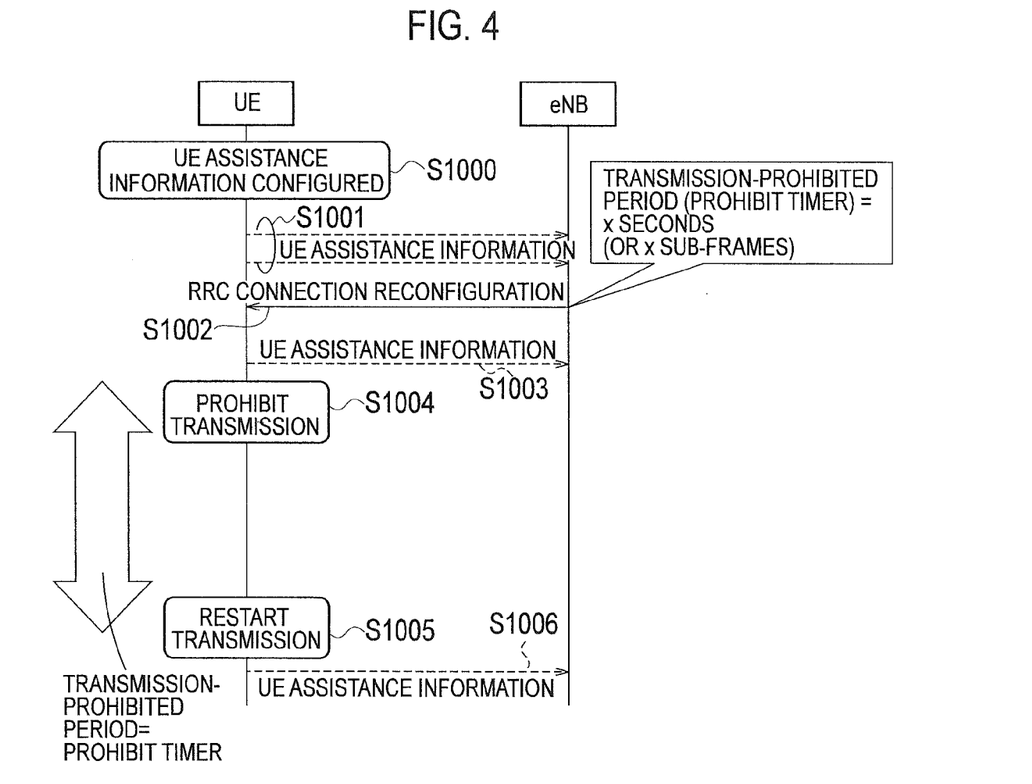
FIG. 4 is a sequence diagram illustrating an operation of the mobile communication system according to the first embodiment of the present invention.

As illustrated in FIG. 4, when transmission of "UE assistance information" is set at step S1000, the mobile station UE repeatedly transmits the "UE assistance information" to the radio base station eNB at step S1001.

The radio base station eNB transmits an "RRC Connection Reconfiguration" including a transmission-prohibited period (Prohibit timer) described above to the mobile station UE at step S1002.

Upon receiving the "RRC Connection Reconfiguration", the mobile station UE transmits "UE assistance information" at step S1003, and then stops the transmission of the "UE assistance information" at step S1004.

Thereafter, after the elapse of the period specified by the transmission-prohibited period, the mobile station UE restarts the transmission of the "UE assistance information" at step S1005.

With the mobile communication system according to the embodiment, the radio base station eNB notifies the mobile station UE of the transmission-prohibited period described above, so that the retransmission of the "UE assistance information" by the mobile station UE can be prohibited.

MODIFICATION EXAMPLE 1

Hereinafter, a mobile communication system according to a modification example 1 of the present invention will be described with reference to FIG. 5 in terms of the difference from the abovementioned mobile communication system according to the first embodiment.

In the mobile communication system according to the modification example 1, the transmitter unit 11 of the radio base station eNB is configured to notify the mobile station UE of the number of transmissions permitted for "UE assistance information".

The transmitter unit 11 may be configured to notify the mobile station UE of the number of transmissions permitted by using an information element "Mac-MainConfig" in an information element "RadioResourceConfigDedicated" included in an "RRC Connection Setup", an "RRC Connection Reconfiguration", an "RRC Connection Reestablishment", or the like, for example.

Moreover, the transmitter unit 11 may be configured to notify the mobile station UE of, as the number of transmissions permitted, a value (for example, "0") indicating that no transmission of the "UE assistance information" is permitted, or a value (for example, "infinite") indicating that no retransmission of the "UE assistance information" is prohibited.

Moreover, when the number of retransmissions of the "UE assistance information" reaches the number of transmissions permitted received by the receiver unit 21 in the mobile station UE, the transmitter unit 23 is configured to stop retransmission of the "UE assistance information".

In this case, before the receiver unit 21 receives again the configuration instruction signal described above from the radio base station eNB, the transmitter unit 23 is configured not to restart the retransmission of the "UE assistance information".

Note that, the transmitter unit 23 may be configured to, when the receiver unit 21 acquires "0" as the number of transmissions permitted, stop the transmission of the "UE assistance information" without transmitting the "UE assistance information" even once.

Alternatively, the transmitter unit 23 may be configured not to stop the transmission of the "UE assistance information" when the receiver unit 21 acquires "infinite" as the number of transmissions permitted.

Hereinafter, an operation of the mobile communication system according to the modification example 1 will be described with reference to FIG. 5.

Figure 5:
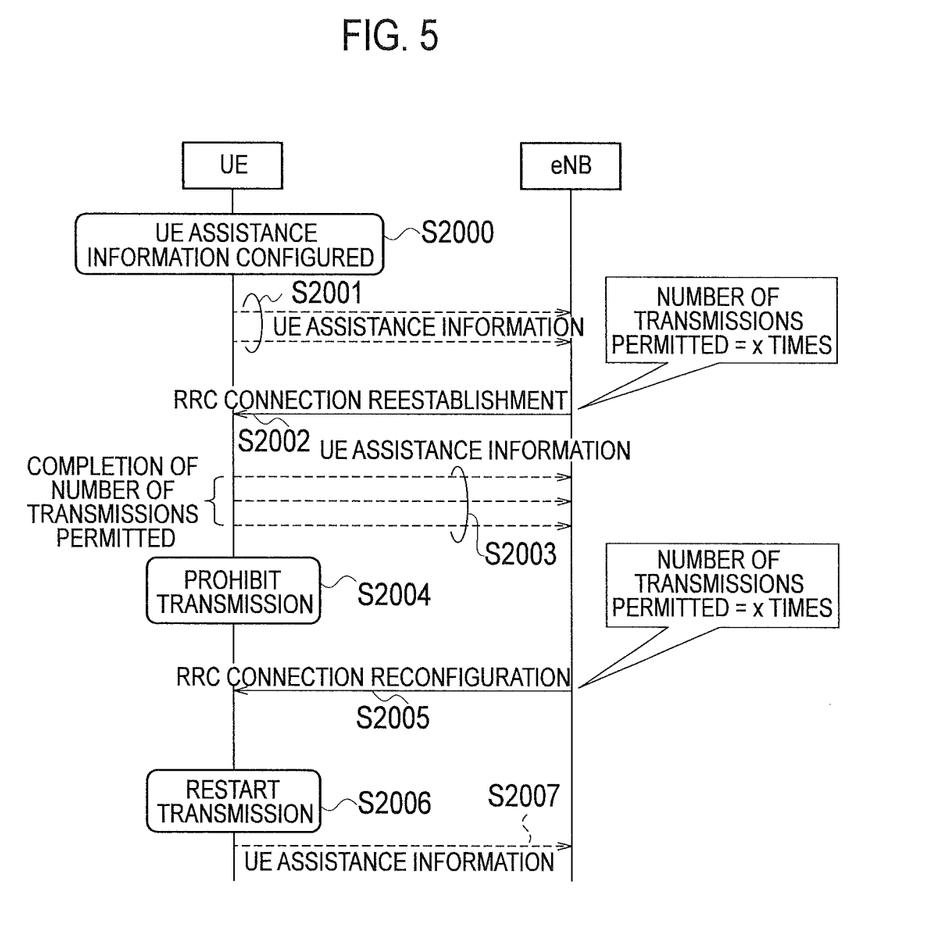
FIG. 5 is a sequence diagram illustrating an operation of a mobile communication system according to a modification example 1 of the present invention.

As illustrated in FIG. 5, when transmission of "UE assistance information" is set at step S2000, the mobile station UE repeatedly transmits the "UE assistance information" to the radio base station eNB at step S2001.

The radio base station eNB transmits an "RRC Connection Reconfiguration" including the number of transmissions permitted described above to the mobile station UE at step S2002.

Upon receiving the "RRC Connection Reconfiguration", the mobile station UE repeats the retransmission of the "UE assistance information" before the number of retransmissions of the "UE assistance information" reaches the number of transmissions permitted "x" at step S2003.

Thereafter, when the number of retransmissions of the "UE assistance information" reaches the number of transmissions permitted "x", the mobile station UE stops the transmission of the "UE assistance information" at step S2004.

Thereafter, when receiving a configuration instruction signal (Configuration) described above from the radio base station eNB at step S2005, the mobile station UE restarts the transmission of the "UE assistance information" at step S2006.

With the mobile communication system according to the modification example 1, the radio base station eNB notifies the mobile station UE of the number of transmission allowance times described above, so that the retransmission of the "UE assistance information" by the mobile station UE can be prohibited.

MODIFICATION EXAMPLE 2

Hereinafter, a mobile communication system according to a modification example 2 of the present invention will be described with reference to FIG. 6 in terms of the difference from the abovementioned mobile communication systems according to the first embodiment and the modification example 1.

In the mobile communication system according to the modification example 2, the transmitter unit 11 of the radio base station eNB is configured to transmit a dedicated signaling indicating retransmission prohibition of the "UE assistance information" to the mobile station UE.

The transmitter unit 11 may be configured to use, as the dedicated signaling, an "RRC Connection Setup", an "RRC Connection Reconfiguration", or an "RRC Connection Reestablishment", for example.

The dedicated signaling may be configured to include an information element "RRC UE assistance config" indicating the retransmission prohibition of the "UE assistance information".

The transmitter unit 23 of the mobile station UE is configured to stop the retransmission of the "UE assistance information" on the basis of the dedicated signaling.

Herein, the transmitter unit 23 is configured to restart the retransmission of the "UE assistance information" when the receiver unit 21 receives a dedicated signaling including an information element "RRC UE assistance config" indicating the retransmission permission of the "UE assistance information".

Figure 6:
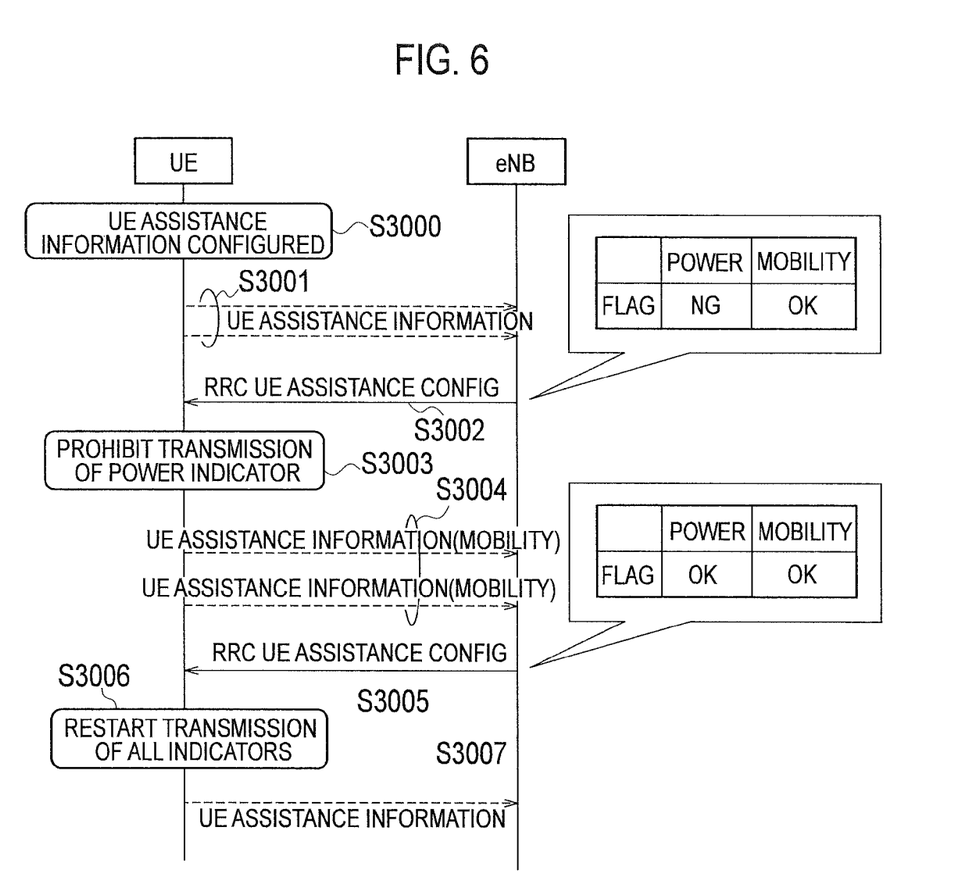
FIG. 6 is a sequence diagram illustrating an operation of a mobile communication system according to a modification example 2 of the present invention.

Note that, the "RRC UE assistance config" may be configured to indicate the retransmission prohibition or the retransmission permission for each of the "UE power preference" and the "UE mobility information" as illustrated in FIG. 6, or may be configured to indicate the transmission prohibition or the retransmission permission for both the "UE power preference" and the "UE mobility information" all together without distinction of them.

Herein, the "RRC UE assistance config" may be configured in one bit if the "UE power preference" and the "UE mobility information" are not distinguished from each other.

Hereinafter, an operation of the mobile communication system according to the modification example 2 will be described with reference to FIG. 6.

As illustrated in FIG. 6, when transmission of "UE assistance information" is set at step S3000, the mobile station UE repeatedly transmits the "UE assistance information" to the radio base station eNB at step S3001.

The radio base station eNB transmits an information element "RRC UE assistance config" indicating the retransmission prohibition of the "UE power preference" and indicating the retransmission permission of the "UE mobility information" to the mobile station UE at step S3002.

Upon receiving the "RRC UE assistance config", the mobile station UE stops the retransmission of the "UE power preference" at step S3003.

Even in this case, the mobile station UE can continue the retransmission of the "UE mobility information" at step S3004.

Thereafter, upon receiving an information element "RRC UE assistance config" indicating the retransmission permission of the "UE power preference" and the retransmission permission of the "UE mobility information" from the radio base station eNB at step S3005, the mobile station UE determines to restart the transmission of the "UE power preference" at step S3006, and transmits "UE assistance information" including the "UE power preference" and the "UE mobility information" to the radio base station eNB at step S3007.

With the mobile communication system according to the modification example 2, the radio base station eNB transmits the dedicated signaling described above to the mobile station UE, so that the retransmission of the "UE assistance information" by the mobile station UE can be prohibited.

The above-described features of the embodiment may also be expressed as follows.

A first feature of the embodiment is summarized as a mobile communication method including the steps of: transmitting "UE assistance information (mobile station assistance information)" to a radio base station eNB by a mobile station UE, the "UE assistance information" prompting the radio base station eNB to change a parameter for the mobile station UE used in the radio base station; notifying, by the radio base station eNB, the mobile station UE of a transmission-prohibited period of the "UE assistance information"; and stopping, by the mobile station UE, retransmission of the "UE assistance information" on the basis of the transmission-prohibited period.

A second feature of the embodiment is summarized as a mobile communication method including the steps of: transmitting "UE assistance information" to a radio base station eNB by a mobile station UE, the "UE assistance information" prompting the radio base station eNB to change a parameter for the mobile station UE used in the radio base station; notifying, by the radio base station eNB, the mobile station UE of the number of transmissions permitted for the "UE assistance information"; and when the number of retransmissions of the "UE assistance information" reaches the number of transmissions permitted, stopping, by the mobile station UE, the retransmission of the "UE assistance information".

A third feature of the embodiment is summarized as a mobile communication method including the steps of: transmitting "UE assistance information" to a radio base station eNB by a mobile station UE, the "UE assistance information" prompting the radio base station eNB to change a parameter for the mobile station UE used in the radio base station; transmitting a dedicated signaling to the mobile station UE by the radio base station eNB, the dedicated signaling indicating retransmission prohibition of the "UE assistance information"; and stopping, by the mobile station UE, the retransmission of the "UE assistance information" on the basis of the dedicated signaling.

A fourth feature of the embodiment is summarized as a mobile station UE including: a transmitter unit 23 configured to transmit "UE assistance information" to a radio base station eNB, the "UE assistance information" prompting the radio base station eNB to change a parameter for the mobile station UE used in the radio base station; and a receiver unit 21 configured to acquire a transmission-prohibited period of the "UE assistance information" from the radio base station eNB. Here, the transmitter unit 23 stops retransmission of the "UE assistance information" on the basis of the transmission-prohibited period.

A fifth feature of the embodiment is summarized as a mobile station UE including: a transmitter unit 23 configured to transmit "UE assistance information" to a radio base station eNB, the "UE assistance information" prompting the radio base station eNB to change a parameter for the mobile station UE used in the radio base station; and a receiver unit 21 configured to acquire the number of transmissions permitted for the "UE assistance information" from the radio base station eNB. Here, when the number of retransmissions of the "UE assistance information" reaches the number of transmissions permitted, the transmitter unit 23 stops the retransmission of the "UE assistance information".

A sixth feature of the embodiment is summarized as a mobile station UE including: a transmitter unit 23 configured to transmit "UE assistance information" to a radio base station eNB, the "UE assistance information" prompting the radio base station eNB to change a parameter for the mobile station UE used in the radio base station; and a receiver unit 21 configured to receive a dedicated signaling from the radio base station eNB, the dedicated signaling indicating retransmission prohibition of the "UE assistance information". Here, the transmitter unit 23 stops the retransmission of the "UE assistance information" on the basis of the dedicated signaling.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-161398 (filed on Jul. 20, 2012) is incorporated by reference in the present specification.

INDUSTRIAL APPLICABILITY

As described above, according to the present invention, it is possible to provide a mobile communication method and a mobile station that can prohibit the retransmission of the "UE assistance information".

EXPLANATION OF THE REFERENCE NUMERALS eNB radio base station
UE mobile station
11, 23 transmitter unit
12, 21 receiver unit
22 management unit

The invention claimed is:

1. A mobile communication method comprising the steps of:
    transmitting mobile station assistance information to a radio base station by a mobile station, the mobile station assistance information prompting the radio base station to change a parameter for the mobile station used in the radio base station, wherein the mobile station assistance information includes a power saving preference for the mobile station;
    notifying, by the radio base station, the mobile station of a transmission-prohibited period of the mobile station assistance information; and
    stopping, by the mobile station, retransmission of the mobile station assistance information on the basis of the transmission-prohibited period, wherein the step of notifying the mobile station of a transmission-prohibited period comprises notifying the mobile station of a value indicating that the transmission-prohibited period is not permanently set.

2. A mobile station comprising:
    a transmitter unit configured to transmit mobile station assistance information to a radio base station, the mobile station assistance information prompting the radio base station to change a parameter for the mobile station used in the radio base station, wherein the mobile station assistance information includes a power saving preference for the mobile station; and
    a receiver unit configured to acquire a transmission-prohibited period of the mobile station assistance information from the radio base station, wherein the transmitter unit stops retransmission of the mobile station assistance information on the basis of the transmission-prohibited period, and
    Wherein the receiver unit is configured to acquire a value indicating that the transmission-prohibited period is not permanently set.

* * * * *